United States Patent [19]

Kneller

[11] Patent Number: 4,740,314
[45] Date of Patent: Apr. 26, 1988

[54] ANIONIC POLYMERS CONTAINING N-VINYL-2-PYRROLIDONE OR OTHER VINYL AMIDES AND MALEIC ANHYDRIDE OR MALEIC ACID AS SCALE INHIBITORS FOR PREVENTING OR REDUCING CALCIUM PHOSPHATE AND OTHER SCALES

[75] Inventor: James F. Kneller, La Grange Park, Ill.

[73] Assignee: Nalco Chemical Company, Naperville, Ill.

[21] Appl. No.: 905,739

[22] Filed: Sep. 10, 1986

Related U.S. Application Data

[63] Continuation of Ser. No. 789,535, Oct. 21, 1985, abandoned, which is a continuation-in-part of Ser. No. 730,609, May 6, 1985, abandoned.

[51] Int. Cl.$^4$ .............................................. C02F 5/12
[52] U.S. Cl. .................................... 210/701; 252/180; 210/698
[58] Field of Search .................. 210/698–701; 252/180, 181

[56] References Cited

U.S. PATENT DOCUMENTS

| 3,331,773 | 7/1967 | Gunderson et al. | 210/701 |
|---|---|---|---|
| 3,806,367 | 4/1974 | Lange et al. | 210/701 |
| 3,900,338 | 8/1975 | Rumpf et al. | 210/701 |
| 4,223,120 | 9/1980 | Kurowsky | 210/701 |
| 4,271,058 | 6/1981 | Trabitzsch et al. | 210/701 |
| 4,288,327 | 9/1981 | Godlewski et al. | 210/701 |
| 4,536,046 | 7/1985 | Meunier et al. | 210/701 |
| 4,673,508 | 6/1987 | Coleman et al. | 210/698 |

FOREIGN PATENT DOCUMENTS 0172154  12/1985  European Pat. Off. .

OTHER PUBLICATIONS

"Mineql, A Computer Program for the Calculation of Chemical Equilibrium Composition of Aqueous Systems", Water Quality Laboratory, J. C. Westall et al., Dept. of Civil Eng. MIT, Jul. 1976, pp. 8–10.

*Primary Examiner*—Peter Hruskoci
*Attorney, Agent, or Firm*—John G. Premo; Anthony L. Cupoli; Donald G. Epple

[57] ABSTRACT

A method of inhibiting scale, generally and specifically and preferably calcium phosphate and calcium carbonate scale, which is found on metal surfaces in contact with industrial cooling waters, boiler waters, oil well drilling waters, and evaporated sea water, which comprises treating the water present in such systems with a few ppm of a water-soluble maleic anhydride or acid co- or terpolymer of N-vinyl-2-pyrrolidone (NVP) or vinyl amide.

4 Claims, No Drawings

ANIONIC POLYMERS CONTAINING N-VINYL-2-PYRROLIDONE OR OTHER VINYL AMIDES AND MALEIC ANHYDRIDE OR MALEIC ACID AS SCALE INHIBITORS FOR PREVENTING OR REDUCING CALCIUM PHOSPHATE AND OTHER SCALES

This is a continuation of co-pending application Ser. No. 789,535 filed on 10/21/85 now abandoned which is a continuation-in-part of application, Ser. No. 730,609, filed May 6, 1985 now abandoned.

Cetain boiler waters and many industrial waters such as those used in the operation of cooling towers are treated with a variety of inorganic and organic phosphorous-containing compounds. Such treatments tend to produce calcium phosphate scales which adhere to the metal surfaces of boilers and metallic heat exchangers.

Many of the known organic scale inhibitors and scale dispersants, both inorganic and those containing water-soluble polymers, while being effective against a wide variety of scales, are not entirely effective against calcium phosphate scales.

Pure calcium phosphate scales may exist as such but frequently are found as contaminants of calcium carbonate and calcium or magnesium salt scales.

In my co-pending application, Ser. No. 730,609, filed May 6, 1985, of which this application is a continuation-in-part, it is disclosed that calcium phosphate scales which are formed on metal surfaces in contact with industrial cooling waters, evaporated sea water, oil well drilling waters, and boiler waters, are inhibited by treating the water present in such systems with a few ppm of a water-soluble anionic co- or terpolymer which contains 5-50 mole percent of N-vinyl-2-pyrrolidone or other vinyl amide monomer. The anionic portion of these polymers utilize such co-monomers as acrylic acid, methacrylic acid, crotonic acid, isocrotonic acid, vinylacetic acid, and itaconic acid. The present invention utilizes N-vinyl-2-pyrrolidone in different proportions than those shown in the above described application and substitutes for the anionic co-monomers maleic anhydride or maleic acid.

THE INVENTION

A method of inhibiting scale, preferably calcium phosphate scale and including calcium and magnesium carbonate scale and slightly soluble zinc compounds, which are formed on metal surfaces in contact with industrial cooling waters, evaporated sea water, oil well drilling waters, and boiler waters, which comprises treating the water present in such systems with a few ppm of a water-soluble maleic anhydride or maleic acid co- or terpolymer which contains 5-50 mole percent of N-vinyl-2-pyrrolidone or other vinyl amide monomer. The preferred composition contains about 25 to 50 mole percent of N-vinyl-2-pyrrolidone or other vinyl amide monomer. The general formula of the vinyl amide monomer (I) is shown below:

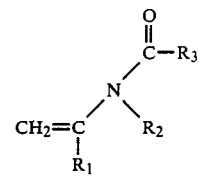

wherein $R_1$ is hydrogen, an alkyl group of straight or branched chain having one to six carbon atoms or an aromatic group; $R_2$ is hydrogen, an alkyl group of straight or branched chain having one to six carbon atoms or an aromatic group; $R_3$ is hydrogen, a straight or branched chain alkyl group having one to seven carbon atoms, aromatic group, alkoxy group or amino group; and the substituents $R_2$ and $R_3$ can also be combined to form a ring structure, such as pyrrolidone, piperidone, succinimide, phthalimide, caprolactam, etc.

An example of the vinyl amide monomers of the general formula (I) are: N-vinyl-2-pyrrolidone, N-vinylpiperidone, N-vinyl caprolactam, N-vinylaxoazolidone, N-vinyl-2-thiazolidinone, N-vinyl hydantoins, N-vinylsuccinimide, N-vinylphthalimide, N-vinyltetrahydrophthalimide, N-vinylglutarimide, vinyl diglycolylimide, vinyl acetamide, vinyl-N-methylacetamide, vinyl-N-phenylacetamide, vinyl formamide, 1-vinyluracil, vinyl ureas and alkyl vinyl carbamates. Among these compounds, N-vinyl-2-pyrrolidone, N-vinylsuccinimide, N-vinyl-N-methylacetamide, N-vinylphthalimide, and N-vinylacetamide are preferred because of availability, convenience of synthesis and cost.

The preferred anionic comonomer is maleic anhydride.

When a terpolymer is utilized, it is prepared by substituting for up to 50 mole percent of either the maleic anhydride or acid with another monomer which is preferably, but not necessarily, water-soluble. The amount of termonomer should not make the finished polymer water-insoluble. Examples of termonomers are acrylic acid, methacrylic acid, itaconic acid, crotonic acid, vinyl acetate, acrylamide, methacrylamide, N-alkanol acrylamides, N-alkanol methacrylamides, N-alkyl acrylamides, N-alkyl methacrylamides, methyl acrylate, ethyl acrylate, propyl acrylate, 2-hydroxyethyl (meth)acrylate, 2-hydroxypropyl (meth)acrylate, n-butyl (meth)acrylate, t-butyl (meth)acrylate, methyl methacrylate, 2-acrylamido-2-methylpropanesulfonic acid, sodium vinyl sulfonate, styrene sulfonic acid, alkoxyethyl acrylates and alkyl vinyl ethers.

The molecular weight of the polymers used in the practice of the invention is between 3,000-100,000 with a preferred molecular weight range being between the range of 5,000-40,000. This molecular weight is determined by aqueous gel permeation chromotography.

The anionic portion of the polymers may be used in the free acid form. However, it is preferred to use the water-soluble salt forms, e.g. sodium, potassium, ammonium, or other metal which does not affect the water solubility of the polymers.

The amount of polymer added to industrial cooling water to prevent scale may be as little as ½ ppm up to dosages as high as 50-100 ppm. A typical dosage would be about 10 ppm. The exact dosage may only be determined by routine experimentation since the scale forming characteristics of a given industrial water will vary depending upon pH, concentration of scale-forming materials in the water, temperature, and other such variables.

ADVANTAGES OF THE INVENTION

A. The maleic anhydride or acid-N-vinylpyrrolidone or other vinyl amide polymers have calcium phosphate scale inhibitor activity equal to a sulfonated styrene-maleic acid polymer (see U.S. Pat. No. 4,288,327, the disclosure of which is incorporated herein by reference) commonly used in cooling water as a $Ca_3(PO_4)_2$ inhibitor (see Table I).

B. Vinylpyrrolidone and other vinyl amide polymers in general are stable in highly alkaline media while acrylate ester and vinyl ester based polymers are not. The acrylate ester and vinyl ester groups in the polymer would hydrolyze easily at high pH's (pH 11-13) used to make formulations containing tolytriazole. Since N-vinylpyrrolidone and other vinyl amides are secondary or tertiary amides, they should also be more hydrolytically stable than common amide monomers such as acrylamide and methacrylamide.

C. Maleic anhydride or acid-N-vinylpyrrolidone and other vinyl amide polymers can be made by a simple one-step polymerization process. In contrast, the polymers described in U.S. Pat. No. 4,288,327 are made by a two-step process involving the use of expensive equipment in order to handle sulfur trioxide or sulfonating reagents.

EVALUATION OF THE INVENTION

In order to evaluate the polymers of the invention, they were subjected to laboratory cooling water tests. The following test methods were used to evaluate the polymers for calcium phosphate scale inhibition and calcium carbonate scale inhibition.

TESTING OF THE POLYMERS AS CALCIUM PHOSPHATE INHIBITORS

Procedure of o-$PO_4$ Filtration Test $Ca_3(PO_4)_2$ Stabilization Test (Note all chemicals are reagent except for treatments)

1. Put 300 to 350 ml of DI water in the 600 ml jacketed beakers and let stand with mild stirring until temperature is brought to 150 degrees F. (70 degrees C.) by use of a constant temperature water bath.

2. Put in required ml of stock hardness into jacketed beakers: for 250 ppm $CaCO_3$, use 50 ml of stock solution.

To make 2 liters of stock solution:
(1) Dissolve 7.356 g $CaCl_2.2H_2O$ in 800 ml DI $H_2O$.
(2) Dissolve 6.156 g $MgSO_4.7H_2O$ in 800 ml DI $H_2O$.
(3) Add both solutions to 2 liter volumetric flask and dilute to volume.
(4) Shake well.

3. Add sufficient ml of treatment into jacketed beakers while stirring (normally 5 mls for 10 ppm of treatment).

4. Add DI water to make 500 ml in jacketed beakers.

5. With stirring, let solutions in beakers equilibrate to 158° F.

6. With stirring, adjust pH to 8.5 with dilute (0.1–0.4N) NaOH.

7. Add 5 ml of 1000 ppm $PO_4$, pH-8.5 solution to jacketed beakers and wait about 3–5 minutes while stirring.

8. Check pH of solution in beakers and as necessary adjust pH to 8.5± while stirring.

9. Let experiment run at 158° F. with stirring for 4 hours.

10. After 15 minutes, check pH of solutions in beakers and as necessary, adjust pH to pH 8.5±0.1. Also, check pH of solutions every 30 to 45 minutes thereafter.

11. After the 4 hours are up, the solution is immediately filtered through 0.45 micron filter paper under vacuum. The filtered solution is analyzed for o-$PO_4$ using standard procedure and the color is evaluated in the spectrophotometer at 700 nm.

12. The results are reported as percent inhibition calculated by the following formula:

$$\text{inhibition} = \frac{(\text{residual o-PO}_4) - \text{blank residual o-PO}_4)}{(\text{initial o-PO}_4) - (\text{blank residual o-PO}_4)} \times 100$$

where:
initial-o-$PO_4$ = o-$PO_4$ concentration in the mixture at the beginning of the experiment.
residual-o-$PO_4$ = o-$PO_4$ concentration in the mixture at the end of the experiment with stabilizer.
blank residual-o-$PO_4$ = o-$PO_4$ concentration in the filtrate at the end of the experiment with no stabilizer.

The results of testing various NVP co- and terpolymers are set forth below in Table I.

TABLE I

Calcium Phosphate Scale Inhibitor Tests[1]
of Maleic Anhydride-N—Vinylpyrrolidone
and Vinyl Amide Polymers

| Composition Number | Sample Composition | Mole Ratio (%) | $MW^2$ (GPC) | % Inhib. ppm Dosage 10 | % Inhib. ppm Dosage 20 | Comments |
|---|---|---|---|---|---|---|
| Comm. Inh. 1 | Sulf.styrene Maleic acid | 75:25 | 18,950 | 85 | | Reference polymer |
| Comm. Inh. 2 | AA/HPA* | 75:25 | 7,350 | 72 | | Reference polymer |
| Comm. Inh. 3 | AA/MeA | 83:17 | 5,780 | 92 | | Reference polymer |
| Comm. Inh. 4 | AA/EA | 85:15 | 3,930 | 62 | | Reference polymer |
| Comm. Poly. 5** | MAH/NVP | | 11,700 | 28 | 80 | |
| Polymer 6 | MAH/NVP | 50:50 | 15,100 | 76 | | |
| Polymer 7 | MAH/NVP | 50:50 | 12,200 | 87 | | |
| Polymer 8 | MAH/NVP | 50:50 | 11,100 | 72 | 98 | |
| Polymer 9 | MAH/NVP/MAM | 40:40:20 | 12,600 | 95 | | |
| Polymer 10 | MAH/NMVAC | 50:50 | 8,890 | 88 | | |
| Polymer 11 | MAH/NVP/MeMA | 40:40:20 | 25,000 | 47 | 85 | |

TABLE I-continued
Calcium Phosphate Scale Inhibitor Tests[1] of Maleic Anhydride-N—Vinylpyrrolidone and Vinyl Amide Polymers

| Composition Number | Sample Composition | Mole Ratio (%) | MW[2] (GPC) | % Inhib. ppm Dosage 10 | % Inhib. ppm Dosage 20 | Comments |
|---|---|---|---|---|---|---|
| Polymer 12 | MAH/NVP/MAA | 40:40:20 | 18,800 | 10 | 36 | |
| Polymer 13 | MAH/NVP/VA | 40:40:20 | 10,200 | 29 | 88 | |
| Polymer 14 | MAH/NVC | 50:50 | 3,970 | 14 | 54 | |
| Polymer 15 | MAH/NVP/TBAM | 40:40:20 | 18,000 | 20 | 49 | |
| Polymer 16 | MAH/NVP/AM | 40:40:20 | 11,100 | 10 | 53 | |
| Polymer 17 | MAH/NVP/AA | 40:40:20 | 17,400 | 11 | 65 | |
| Polymer 18 | MAH/NVP/BVE | 40:40:20 | 39,100 | 13 | | |
| Polymer 19 | MAH/NVP/MeA | 40:40:20 | 18,200 | 100 | | |

*See Glossary.
**Contains more than 50 mole % NVP.
[1] All screening tests done using water containing 250 ppm of Ca (as CaCo3), 125 ppm Mg (as CaCO3), pH maintained at 8.5, no iron added, tests run for 4 hrs. before filtering off any Ca3(PO4)2 precipitate through a 0.45 micron filter.
[2] Molecular weights determined by GPC in aqueous solution using sulfonated polystyrene standards.

GLOSSARY

| | |
|---|---|
| Comm. Inh. = | Commercial Inhibitor |
| AA = | acrylic acid |
| AM = | acrylamide |
| EA = | ethyl acrylate |
| HPA = | 2-hydroxypropyl acrylate |
| MeA = | methyl acrylate |
| MAA = | methacrylic acid |
| MAH = | maleic anhydride |
| NVP = | N—vinylpyrrolidone |
| NMVAC = | N—methyl-N—vinylacetamide |
| MeMA = | methyl methacrylate |
| VA = | vinyl acetate |
| NVC = | N—vinylcaprolactam |
| TBAM = | t-butylacrylamide |
| BVE = | n-butyl vinyl ether |
| MAM = | methacrylamide |

I claim:

1. A method for inhibiting calcium phosphate scale which is formed on metal surfaces in contact with industrial cooling waters, oil well drilling waters, boiler waters, and evaporated sea water, which comprises treating these waters at a pH of at least about 8.5 with from ½ to 100 ppm of a water-soluble terpolymer containing about 40-50 mole percent of maleic anhydride or acid, about 25-50 mole percent of a vinyl amide selected from the group consisting of N-vinyl-2-pyrrolidone and N-methyl-N-vinyl acetamide, and about 20-25 mole percent of a termonomer selected from the group consisting of methyl acrylate and methacrylamide, said polymer having a molecular weight within the range of from 5,000 to 40,000.

2. A method of inhibiting calcium phosphate scale which is formed on metal surfaces in contact with industrial cooling waters, oil well drilling waters, boiler waters, and evaporated sea water, which comprises treating these waters at a pH of at least about 8.5 with from ½ to 100 ppm of a water soluble terpolymer containing about 40-50 mole percent of maleic anhydride or acid, about 25-50 mol percent N-vinyl-2 pyrrolidone, and about 20-25 mole percent of a termonomer selected from the group consisting of methyl acrylate and methacrylamide, said polymer having a molecular weight within the range of from 10,200 to 25,000.

3. The method of claim 2, wherein the terpolymer is derived from maleic anhydride.

4. The method of claim 2, wherein the terpolymer is derived from maleic acid.

* * * * *